(12) United States Patent
Dunn et al.

(10) Patent No.: US 7,428,750 B1
(45) Date of Patent: Sep. 23, 2008

(54) MANAGING MULTIPLE USER IDENTITIES IN AUTHENTICATION ENVIRONMENTS

(75) Inventors: Melissa W. Dunn, Woodinville, WA (US); Matt C. Jones, Issaquah, WA (US); Xiang Xian, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 1125 days.

(21) Appl. No.: 10/395,353

(22) Filed: Mar. 24, 2003

(51) Int. Cl.
*G06F 7/04* (2006.01)
(52) U.S. Cl. .......................................................... 726/8
(58) Field of Classification Search ...................... 726/6, 726/8, 10, 5
See application file for complete search history.

(56) References Cited

U.S. PATENT DOCUMENTS

| | | | |
|---|---|---|---|
| 6,064,666 A | 5/2000 | Willner et al. | |
| 6,178,511 B1 * | 1/2001 | Cohen et al. | 726/6 |
| 6,243,816 B1 * | 6/2001 | Fang et al. | 726/5 |
| 6,959,336 B2 * | 10/2005 | Moreh et al. | 709/229 |
| 6,981,043 B2 * | 12/2005 | Botz et al. | 709/225 |
| 7,155,739 B2 * | 12/2006 | Bari et al. | 726/6 |
| 7,188,181 B1 | 3/2007 | Squier et al. | |
| 7,260,838 B2 * | 8/2007 | Bones et al. | 726/8 |
| 2002/0023059 A1 | 2/2002 | Bari et al. | |
| 2002/0078365 A1 | 6/2002 | Burnett et al. | |
| 2002/0143909 A1 | 10/2002 | Botz et al. | |
| 2002/0184507 A1 * | 12/2002 | Makower et al. | 713/182 |
| 2003/0191703 A1 | 10/2003 | Chen et al. | |
| 2004/0083243 A1 | 4/2004 | Feng et al. | |
| 2005/0240622 A1 | 10/2005 | Cheung | |

OTHER PUBLICATIONS

Samar, "Single Sign-On Using Cookies for Web Applications," Enabling Technologies: Infrastructure for Collaborative Enterprises Proceedings, IEEE 8th International Workshops, Jun. 16, 1999, pp. 158-163.
De Capitani di Vimercati et al., "Access Control in Federated Systems," Proceedings of the 1996 Workshop on New Security Paradigms, 1996, pp. 87-99, ACM Press, New York, U.S.A.
Gabber, "On Secure and Pseudonymous Client-Relationship with Multiple Servers," ACM Transactions on Information and System Security, Nov. 1999, pp. 390-415, vol. 2, Issue 4, ACM Press, New York, U.S.A.
Wang et al., "Ticket-Based Service Access Scheme for Mobile Users," Proceedings of the Twenty-fifth Australasian Conference on Computer Science, 2002, vol. 4, pp. 285-292, Australian Computer Society, Inc., Australia.
Wobber et al., "Authentication in the Taos Operating System," ACM Transactions on Computer Systems (TOCS), Feb. 1994, vol. 12, Issue 1, pp. 3-32, ACM Press, New York, U.S.A.
Arlein et al., "Privacy-Preserving Global Customization," Proceedings of the 2nd ACM Conference on Electronic Commerce, 2000, pp. 176-184, ACM Press, New York, U.S.A.

* cited by examiner

*Primary Examiner*—Ellen Tran
(74) *Attorney, Agent, or Firm*—Senniger Powers

(57) ABSTRACT

Managing a plurality of identities associated with a user. The invention includes a system for managing multiple credentials within the same authentication system and across federated authentication systems in such a manner that signing in with one credential allows access to content, information or services that may be associated with another credential.

42 Claims, 7 Drawing Sheets

MANAGING MULTIPLE USER IDENTITIES IN AUTHENTICATION ENVIRONMENTS

TECHNICAL FIELD

The present invention relates to the field of authentication. In particular, this invention relates to managing multiple identities in authentication environments.

BACKGROUND OF THE INVENTION

Web sites such as Internet sites often provide information, products, services, and the like to their users. Many web sites require users to register before their web servers will grant access to the users. During registration, a user typically supplies personal information such as a username, account number, address, telephone number, e-mail address, computer platform, age, gender, and/or hobbies to the registering web site. The registration information may be necessary to complete transactions (e.g., commercial or financial transactions). Typically, the information also permits the web site to contact the user directly (e.g., via electronic mail) to announce, for example, special promotions, new products, or new web site features. Additionally, web sites often collect user information so web site operators can better target future marketing activities or adjust the content provided by the sites.

When registering a user for the first time, a web site typically requests that the user select a login identifier, or login ID, and an associated password. The login ID allows the web site to identify the user and retrieve information about the user during subsequent user visits to the web site. Generally, the login ID must be unique to the web site such that no two users have the same login ID. The combination of the login ID and password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medical records.

If the user visits several different web sites, each web site may require entry of similar registration information about the user, such as the user's name, mailing address, and e-mail address. This repeated entry of identical data is tedious when visiting multiple web sites in a short period of time. Many web sites require the user to register before accessing any information provided on the site. Thus, the user must first enter the requested registration information before he or she can determine whether the site contains any information of interest.

After registering with multiple web sites, the user must remember the specific login ID and password used with each web site or other network service. Without the correct login ID and password, the user must re-enter the registration information. A particular user is likely to have different login IDs and associated passwords on different web sites. For example, a user named Bob Smith may select "smith" as his login ID for a particular site. If the site already has a user with a login ID of "smith" or requires a login ID of at least six characters, then the user must select a different login ID. After registering at numerous web sites, Bob Smith may have a collection of different identities (e.g., login IDs) such as: smith, smith1, bsmith, smithb, bobsmith, bob_smith, and smithbob. Further, different passwords may be associated with different login IDs due to differing password requirements of the different web sites (e.g., password length requirements or a requirement that each password include at least one numeric character and/or at least one uppercase character). Thus, Bob Smith must maintain a list of web sites, login IDs, and associated passwords for all services, devices, sites, or access networks that he frequents regularly.

Although presently available multi-site user authentication systems permit a web user to maintain a single login ID (and associated password) for accessing multiple, affiliated web servers or services, further improvements are desired. For example, users in present systems who wish to maintain multiple identities do so manually by signing in under each one in order to present the site, service or application with the information associated with that identity. In the case where a user maintains multiple identities within the same authentication system, the user signs in with each credential separately to present a different set of information to different web sites/services and to make changes to that information. Present systems fail to provide a way for the user to manage the credentials as if the credentials were linked into a single credential. Further, in the case where the user maintains multiple credentials across multiple authentication systems, present systems fail to provide the user with a method of signing in using a single credential and then accessing content, information or services that typically require the use of one of the other credentials. That is, the notion of commutative identities is not supported by existing systems. Large corporations or entities desire technologies that enable identity management to allow users to combine identities and to simplify access to services and sites. For example, corporations desire an identity management system to allow the user to access all of their services and information without having to remember which identity is required for which service or site.

Some existing systems employ a shared set of data or a distributed set of data regarding multiple user identities that is accessible by several services at any time. However, such systems lack privacy controls by allowing the services to be aware of all other identities for the user at any given time including the original sign-on identity of the user.

For these reasons, a system for managing multiple identities in authentication environments is desired to address one or more of these and other disadvantages.

SUMMARY OF THE INVENTION

The invention includes software referred to as an identity broker that acts as an agent of a user to broker identities or personas (e.g., accounts) on behalf of the user. In particular, the invention includes a system for managing multiple credentials within the same authentication system and across federated authentication systems in such a manner that signing in with one credential allows access to content, information or services that may be associated with another credential. The invention allows the user with trusted credentials to change a request to that credential without having to re-authenticate manually. Further, software of the invention allows the user to manage multiple identities to enable scenarios that simplify the use of networks both within and across corporate or federated boundaries. The invention contains software including a user interface that provides the user with the ability to work device-independent within a federated network. Alternatively, the invention software may be engendered on a client device, for example, as a construct in an operating system. Further, default credentials may be set per site, target, or application. In addition, users may add new credentials, identify and/or delete saved credentials, and identify the identity that an application or site is using.

In accordance with one aspect of the invention, a method manages a plurality of identities associated with a single user. The method includes receiving user identity information from the user. The user identity information corresponds to a plurality of user identities. Each of the user identities is associated with one or more of a plurality of target services. The method also includes sending one or more requests to the target services to obtain additional user identity information. The additional user identity information includes credential information for each of the user identities. Each of the requests includes a portion of the received user identity information. The method also includes receiving the additional user identity information from the target services in response to authentication of the user by the target services via the sent requests. The method also includes registering the user identity information and the additional user identity information for management of the user identities.

In accordance with another aspect of the invention, a method manages user identity information corresponding to a plurality of identities associated with a user. Each of the user identities is associated with one or more of a plurality of target services. The identities are stored in a database. The method includes interacting with one of the target services to provide the user identity information to the target service in response to a request from the target service for one or more of the identities associated therewith. Interacting with the target service includes receiving a request from the target service for one or more of the user identities associated therewith. The request includes a list of requested identity types. Interacting with the target service also includes retrieving the user identity information corresponding to the list of requested identity types from the database. Interacting with the target service also includes providing the retrieved user identity information to the target service in response to the received request.

In accordance with yet another aspect of the invention, a method manages a plurality of identities associated with a user in a computer system having a graphical user interface including a display and a user interface selection device. The method includes displaying a registration user interface to the user on the display. The registration user interface defines a user identity information field. The method also includes receiving from the user via the user interface selection device user identity information associated with the user identity information field. The user identity information corresponds to a plurality of user identities. Each of the user identities is associated with one or more of a plurality of target services. The method also includes receiving an execution signal from the user via the user interface selection device. The method also includes registering, in response to the received execution signal, the received user identity information for management of the user identities.

In accordance with still another aspect of the invention, a computer-readable medium stores a data structure representing a plurality of identities associated with a user. Each of the user identities is associated with one or more of a plurality of target services. The data structure includes a first field representing user identity information corresponding to the user identities. The data structure also includes a second field representing additional user identity information to provide authentication for each of the user identities stored in the first field.

In accordance with another aspect of the invention, one or more computer-readable media have computer-executable components for managing a plurality of identities associated with a user. The components include an interface module for receiving user identity information from the user. The user identity information corresponds to a plurality of user identities. Each of the user identities is associated with one or more of a plurality of target services. The components also include a validation module for sending one or more requests to the target services to obtain additional user identity information. The additional user identity information includes credential information for each of the user identities. Each of the requests includes a portion of the received user identity information. The validation module receives the additional user identity information from the target services in response to authentication of the user by the target services via the sent requests. The components also include a database module for registering the received user identity information and received additional user identity information for management of the user identities.

In accordance with yet another aspect of the invention, an account management system manages a plurality of identities associated with a user. The account management system includes a user interface for receiving user identity information from the user. The user identity information corresponds to a plurality of user identities. Each of the user identities is associated with one or more of a plurality of target services. The system also includes a validation component for sending one or more requests to the target services to obtain additional user identity information. The additional user identity information includes credential information for each of the user identities. Each of the requests includes a portion of the received user identity information. The validation component receives the additional user identity information from the target services in response to authentication of the user by the target services. The system also includes a database that stores the user identity information received by the user interface and the additional user identity information received by the validation component. The system also includes computer-executable instructions which, when executed on a data processing system having a processor and access to the database, manage the user identities. Managing the user identities includes receiving, from the one of the target services, a request for one or more of the user identities associated therewith. The request includes a list of requested identity types. Managing the user identities also includes retrieving the registered user identity information from the database corresponding to the list of requested identity types. Managing the user identities also includes providing the retrieved user identity information to the one of the target services in response to the received request.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
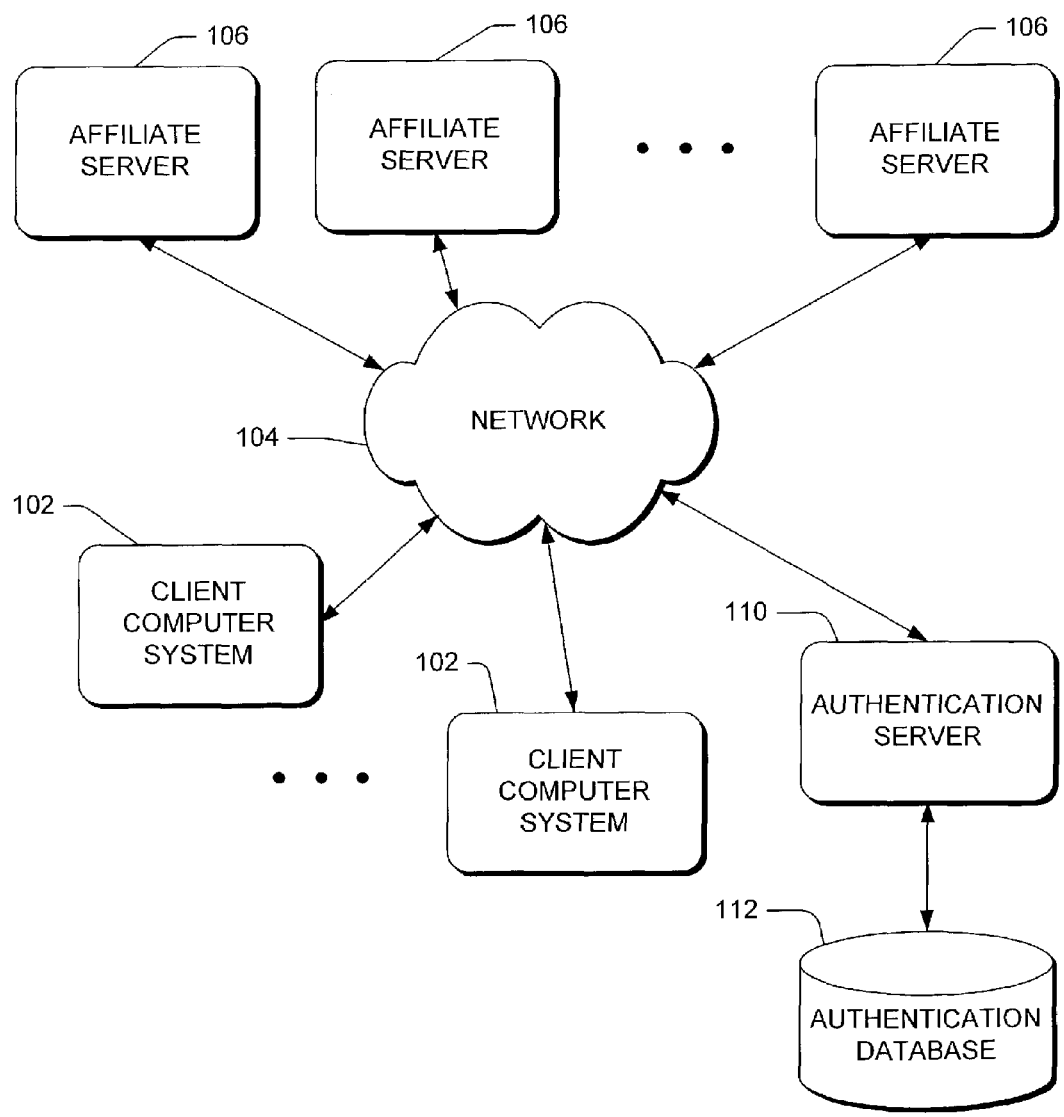
FIG. 1 is a block diagram illustrating one example of a suitable network environment in which the invention may be implemented.

According to one embodiment, the invention includes managing a plurality of identities such as computer accounts or personas associated with a user. The invention includes software referred to herein as an identity broker that acts as a central repository to store identity information associated with the user and to provide the stored user identity information to a target service (see FIG. 2). The invention software includes a user interface for registering (e.g., storing) the identity information received from the user and allowing the user to modify the registered identity information. The user identity information includes, for example, a user name, login identifier, password, and credential information. A credential includes special information that is used to authenticate a user account. For example, a credential may include a username and password, a smart card and a personal identification number, a certificate, a token, or a ticket. In operation, the user logged in as one identity visits a target service (e.g., a web site or an application program) that communicates with the invention software to obtain any identity and information associated with that identity stored by the invention software on the list of acceptable identities for the user.

In contrast with trust broker systems that determine whether or not an incoming credential is acceptable, the identity broker changes the identity of the user without allowing any party other than the user to know about the incoming credential. The identity broker is trusted by the user, while the trust brokers are trusted by the companies on either side of the transaction.

While the invention is described herein as software including a user interface that provides the user with the ability to work device-independent within a network, it is contemplated by the inventors that the invention software may be implemented in various ways within the scope of the invention. For example, the invention software may be engendered on a client device construct in an operating system. Alternatively or in addition, the invention software may operate in both the server and the client to provide redundancy if either the server or the client fails. In such an embodiment, a synchronization component maintains synchronization between the identity information stored by the client and stored by the server. In another embodiment, a trusted relationship exists between one or more of the target services such that user privacy is enhanced whenever the client sends an identity to one of the target services.

The invention provides numerous features and advantages next described. With the invention, users may use, save, edit, delete, enumerate, sign in, and sign out of all associated identities on a computer easily. Further, the user may set default identities per target service and per application. For example, if the user has multiple electronic mail (email) accounts, the user may designate one of the accounts as the default account. The credential associated with the default email account is automatically used when the user attempts to check email. Further, the user may easily submit a saved credential without re-entering the credential every time. The identity broker also supports a multiple identity aware application. For example, the user may read and write email from multiple accounts or chat with two sets of on-line friends at the same time from the same application while projecting different identities to each set of friends.

Exemplary Network Environment

Referring now to the drawings, FIG. 1 illustrates an exemplary network environment in which the present invention is utilized. The invention relates to cross-network collaboration between web sites as part of a distributed, multi-site user authentication system. Such services provide a user with the ability to access one or more participating web sites or resources with a single sign-in. Although the participating, or affiliate, sites still maintain control over permissions, they use the authentication service rather than hosting and maintaining their own proprietary authentication systems. Those skilled in the art will note that although the invention is described in terms of a multi-site user authentication system, it is contemplated by the inventors that the invention is operable with any type and number of authentication systems. For example, the target service may perform authentication.

In FIG. 1, one or more client computer systems 102 are coupled to a data communication network 104. In this example, the network 104 is the Internet (e.g., supporting the World Wide Web). However, the teachings of the present invention can be applied to any data communication network. Multiple affiliate servers 106 are also coupled to network 104. In turn, the client computer systems 102 can access the affiliate servers 106 via network 104. Affiliate servers 106 are also referred to as web servers or network servers.

An authentication server 110 coupled to network 104 allows communication between itself and client computer systems 102 and web servers 106. Although referred to as an authentication server, authentication server 110 in the illustrated embodiment is also a web server capable of interacting with web browsers and other web servers. In this example, authentication server 110, client computer systems 102, and web servers 106 communicate data among themselves using the hypertext transfer protocol (HTTP), a protocol commonly used on the Internet to exchange information. An authentication database 112 is coupled to authentication server 110. The authentication database 112 contains information (e.g., credentials) necessary to authenticate a user of one of the client computer systems 102 (as well as other users on the network) and also identifies which elements of the user profile information should be provided to a particular affiliate server 106 when the user accesses the affiliate server. In general, a credential includes a means for generating an authenticated reference to a single account identifier. For example, an EASI sign-in name and password, a mobile phone number and a personal identification number (PIN), and a biometric signature are all credentials that can be associated with the same profile data.

Although authentication database 112 is shown separately from authentication server 110, it is to be understood that in other embodiments of the invention, authentication database 112 may be contained within authentication server 110. Further, the invention software is operable in a federated environment with a plurality of authentication systems (e.g., a plurality of authentication servers 110 and databases 112) as well as in a non-federated environment with a single authentication system (e.g., as illustrated in FIG. 1).

The authentication server 110, as described herein, authenticates a user of client computer 102 seeking access to a particular one of the affiliate servers 106. Authentication server 110 first requests authenticating login information from the user, such as the user's login ID and password. If the user is successfully authenticated, authentication server 110 routes the user's client computer 102 to the appropriate affiliate server 106 for performing a desired service for the user.

As part of the user authentication process, authentication server 110 may provide certain user profile information to affiliate server 106, such as the user's e-mail address, user preferences, and the type of Internet browser installed on client computer 102. This user profile information is associated with the user's login ID so that each time the user logs into a particular affiliate server 106, the associated user profile information is available to the affiliate server. This user profile allows the user to enter the information once and use that same information during subsequent logins to new affiliate servers. By maintaining user profile information, the authentication system of the invention is able to share pertinent information with the affiliate sites to speed registration and enable access to personalized accounts or services.

In one embodiment, an affiliate server registers or otherwise establishes a relationship or affiliation with authentication server 110. Each affiliate server 106 includes a code sequence (not shown) that allows the affiliate server to communicate with authentication server 110 when a user (who is also registered with authentication server 110) requests access to affiliate server 106.

Prior to executing the authentication process, both the user of client computer system 102 and the operator(s) of affiliate servers 106 register with authentication server 110. This registration is a one-time process that provides necessary information to the authentication server. The user of client computer system 102 registers with authentication server 110 by providing information about the user and/or client computer system 102, such as, the user's name, mailing address, and e-mail address. As part of the user registration process, the user is assigned (or selects) a login ID, which is a common login ID, used to access any affiliate server (e.g., server 106). The login ID may also be referred to herein as a username, member name, or login name. As described above, multi-site user authentication systems of the type described herein permit the user to establish a unique account identified by an e-mail address. An EASI (E-mail As Sign-In) account allows the user to use an existing e-mail address as a login ID, or sign-in name (e.g., Jane@pageA.net) while supplying all the other attributes used to create an account.

Additionally, the user selects a password associated with the login ID that is used for authentication purposes. After registering and logging into authentication server 110, the user can visit any affiliate server 106 (i.e., affiliate servers that are also registered with the same authentication server) without requiring any additional authentication and without re-entering user information that is already contained in the associated user profile. The present invention sets forth identifying the user account, or profile, by a unique account identifier.

The operator(s) of affiliate servers 106 register with authentication server 110 by providing information about the affiliate server (e.g., server name and network address). Additionally, each affiliate server 106 provides information regarding its authentication requirements. The requirements for authentication may be specified in terms of a maximum time allowed since the last login and entry of authentication information by the user. These requirements may also be specified by the maximum time allowed since the last "refresh" of the authentication information by the user. After registering with authentication server 110, affiliate servers 106 can use the authentication server to authenticate any user that has also registered with the authentication server.

Exemplary Operation of the Identity Broker

Figure 2:
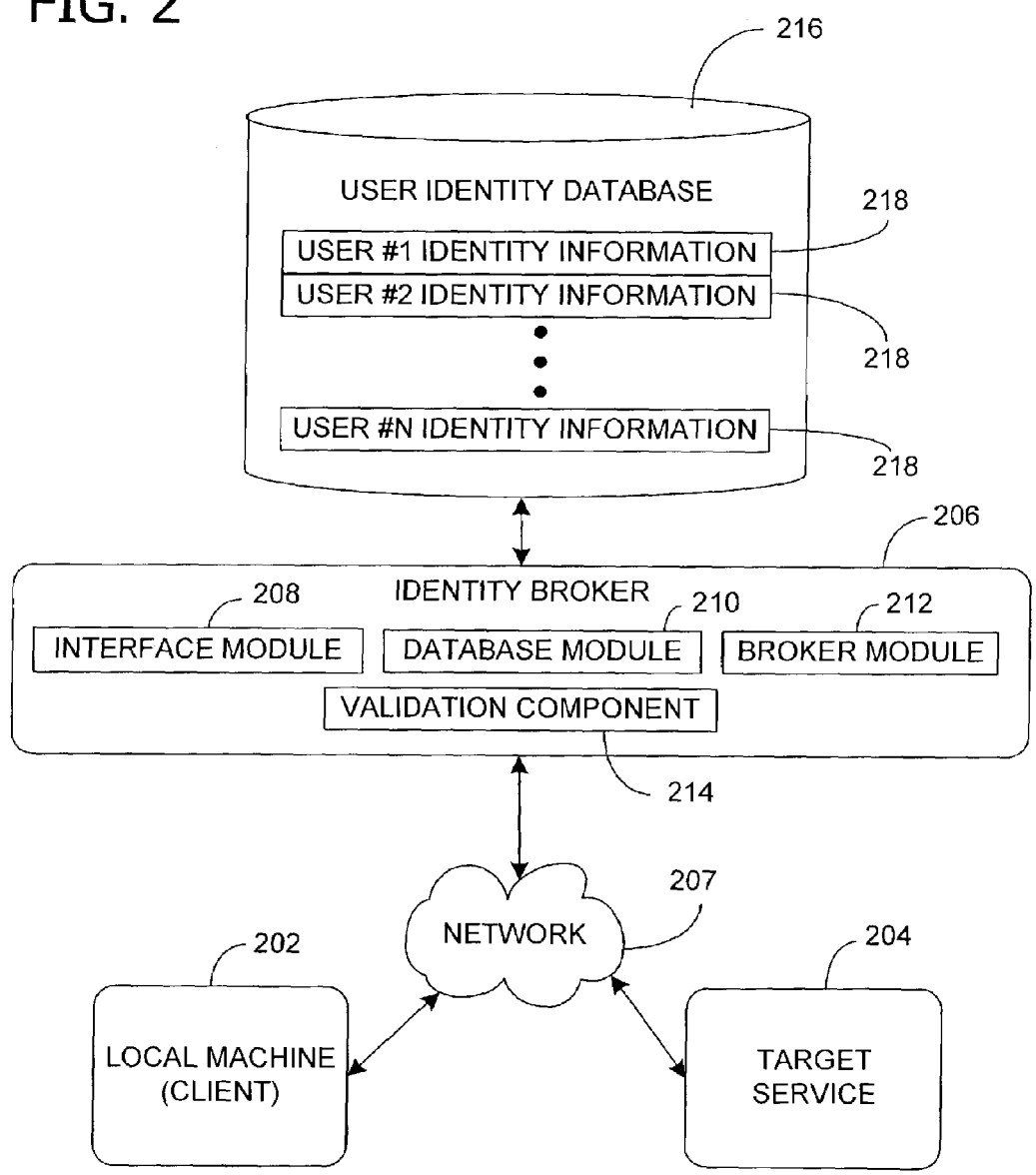
FIG. 2 is an exemplary block diagram illustrating connections between a user, a target service, and the identity broker of the invention.

Referring next to FIG. 2, an exemplary block diagram illustrates connections between the client 202, a target service 204, and the identity broker 206 of the invention via a network 207. Those skilled in the art will note that the components and modules of the invention may be implemented within the identity broker 206 as illustrated in FIG. 2 or may be distributed across a plurality of servers coupled to a data communication network such as the Internet (not shown). Further, the identity broker 206 may be located on the client 202 or in a user-owned service (not shown).

FIG. 2 illustrates an account management system in which the user on a local machine (e.g., client 202) communicates with the target service 204 (e.g., a web site or an application program implemented on affiliate server 106) and the identity broker 206 via network 207. The account management system (e.g., the identity broker 206 and database 216) manages a plurality of identities associated with the user. The user registers user identity information corresponding to the user identities with the identity broker 206. Each of the user identities is associated with one or more of a plurality of the target services 204. The identity broker 206 includes a user interface or other interface module 208 for receiving the user identity information from the user, a database module 210 (see also FIG. 3), a broker module 212 (see also FIG. 3), and a validation component or module 214. During registration, the validation component 214 sends one or more requests to the target services 204 to obtain additional user identity information such as credential information for each of the user identities. Each of the requests includes a portion of the user identity information received from the user (e.g., a login and password of the user). The validation component 214 receives the additional user identity information from the target services 204 in response to authentication of the user by the target services 204.

The account management system also includes a user identity database 216 storing the user identity information received by the user interface and the additional user identity information received by the validation component 214. For example, the database 216 may store user identity information 218 for N users, wherein N is a positive integer. According to one embodiment of the invention, the database 216 includes a computer-readable medium storing a data structure representing a plurality of identities associated with the user. The data structure includes a first field representing user identity information corresponding to the user identities and a second field representing additional user identity information (e.g., credential information) to provide authentication for each of the user identities. In one example, the user identity information includes, but is not limited to, a user identifier (e.g., a login name or a username) and a password. Similarly, the additional user identity information includes, but is not limited to, credential information such as a certificate, an authentication token, or an authentication ticket.

The database 216 may be a relational database using indexing for fast and efficient data retrieval. Exemplary user identity information includes, but is not limited to, a list of users, identities of the users, and credential information for the identities. In one embodiment, a table in the database 216 maintained by the identity broker 206 includes a plurality of entries where each entry identifies one user (e.g., user) and an additional identity of the user. Table 1 illustrates sample entries for such a table. In Table 1, User #1 and User #2 are user identifiers while Identity_A and Identity_B are other user identifiers for User #1 and User #2 respectively. In another embodiment, Identity_A and Identity_B may be credentials such as received certificates, tokens, passwords, or authentication tickets. The certificate certificate_pageA.net represents a credential for User #1 received from a pageA.net service.

TABLE 1

Exemplary Identity Table Maintained by the Identity Broker.

User #1 Identity_A
User #1 Identity_B
User #1 certificate_pageA.net
User #2 Identity_A In another embodiment, each entry in the table corresponds to all the identities associated with a specific user such as user. For example, with reference to the data in Table 1, a single entry for User #1 would include Identity_A, Identity_B, and certificate_pageA.net.

The linking relationship as illustrated in Table 1 is a simplified version of a parent-child relationship where there is only one parent instead of multiple parents. Thus the existing structure can be duplicated to maintain the linking information. For every identity or user identifier such as User #1, the identity broker 206 stores an additional flag to indicate whether or not this identity is linked to some other identity. If the identity is linked to other identities, the other identities can be retrieved from a table that stores the identities in groups. Adding an identity to a group of linked identities involves changing the flag for that identity (if necessary) and creating an entry for that identity in the table. Removing an identity from a group of linked identities involves changing the flag for that identity (if necessary) and deleting the corresponding entry from the table.

A linking structure such as illustrated in Table 1 enables many other useful tools for multiple account owners such as viewing and performing actions on their accounts all at once. In addition, affiliate sites may provide more customizations to enhance the user experience if the affiliate sites are granted consent by users to know the linking relationship between the multiple accounts.

The account management system illustrated in FIG. 2 also includes computer-executable instructions which, when executed on a data processing system having a processor and access to the database 216, manage the user identities. In one example, the computer-executable instructions are embodied in the components and modules illustrated in the identity broker 206 in FIG. 2. The computer-executable instructions operate to receive, from the target service 204, a request for one or more of the user identities associated therewith. The request may include a list of requested identity types. The computer-executable instructions operate to retrieve the registered user identity information from the database 216 corresponding to the list of requested identity types. The computer-executable instructions may also operate to validate the retrieved user identity information. The computer-executable instructions then operate to provide the retrieved user identity information to the target service 204 in response to the received request.

Figure 3:
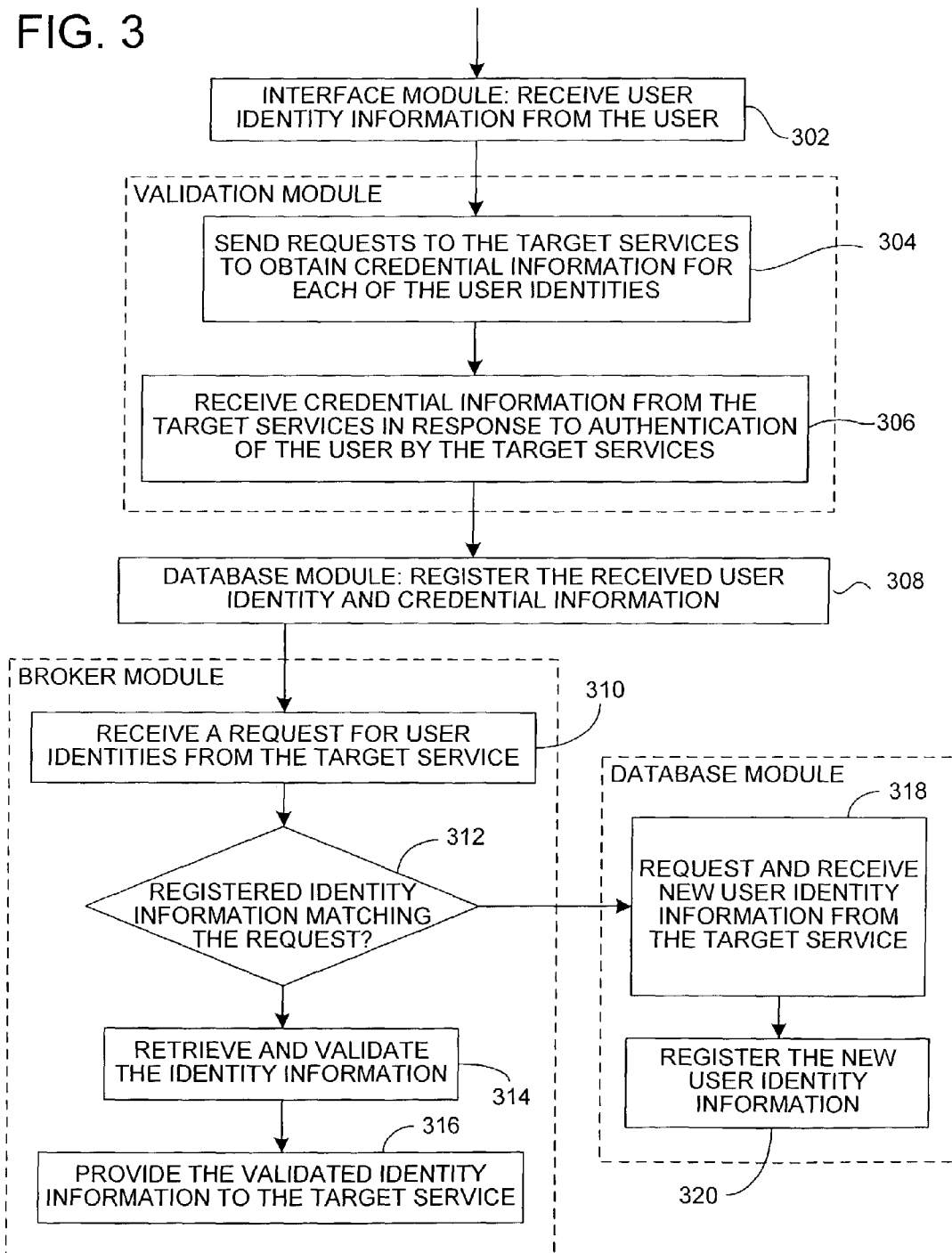
FIG. 3 is an exemplary flow chart illustrating operation of software according to the invention.

Referring next to FIG. 3, an exemplary flow chart illustrates operation of software according to the invention during registration of user identities. In one embodiment, one or more computer readable media have computer-executable instructions for performing the method illustrated in FIG. 3. During registration of the user identity information (e.g., via a user interface), the interface module 208 of the identity broker 206 receives user identity information from the user corresponding to a plurality of user identities at 302. In one embodiment, the user identities are associated with at least one target service 204. The validation component 214 of the identity broker 206 sends one or more requests to the target service 204 associated with the user identity to obtain additional user identity information such as credential information at 304. Each of the requests includes a portion of the user identity information received from the user. For example, the interface module 208 may receive a username and password and the validation component 214 sends the username and password received from the validation component 214 to the target service 204 to authenticate or otherwise validate the user. In an example in which the target service 204 delegates authentication to a multi-site user authentication system, the target service 204 sends the received username and password to the authentication system to authenticate the user and receives credential information from the authentication system. The validation component 214 receives the additional user identity information (e.g., the credential information) from the target service 204 in response to authentication of the user by the target service 204 (or multi-site user authentication system) at 306. The database module 210 registers the received user identity information and received credential information for management of the user identities at 308. For example, the database module 210 may link the user identities by storing the user identity information in the database 216 for access when the user subsequently seeks access to the target service 204 or another target service.

The broker module 212 of the identity broker 206 interacts with the target service 204 to provide registered user identity information to the target service 204 in response to a request from the target service 204 for one or more of the user identities. For example, the broker module 212 may receive, from the target service 204, a request for one or more of the user identities at 310. The request includes a list of requested identity types. The broker module 212 accesses the database 216 to determine if the database 216 includes registered user identity information corresponding to the list of requested identity types at 312. The broker module 212 retrieves the registered user identity information at 314, if it exists, and provides the retrieved user identity information to the target service 204 at 316. In one embodiment, the broker module 212 validates the retrieved user identity information prior to providing the retrieved user identity information to the target service 204. For example, the broker module 212 may send the retrieved user identity information to an authentication system to authenticate the user. The broker module 212 receives validated user identity information (e.g., credential information) from the authentication system. In this example, the broker module 212 provides the validated user identity information to the target service 204.

If no user identity information in the database 216 corresponds to the list of requested identity types, the database module 210 requests, from the target service 204, new user identity information associated with the user at 318. The database module 210 receives the requested, new user identity information from the target service 204 and registers the received, requested, new user identity information at 320. The new user identity information may include credential information.

The user also interacts with the identity broker 206 to modify registered user identity information of the user. The identity broker 206 may receive from the user a request with instructions to modify the registered user identity information. The identity broker 206 modifies the registered user identity information in accordance with the received instructions and delivers a response to the user. For example, the user may instruct the identity broker 206 to unlink one of the user identities from the other identities (see FIG. 6).

Figure 4:
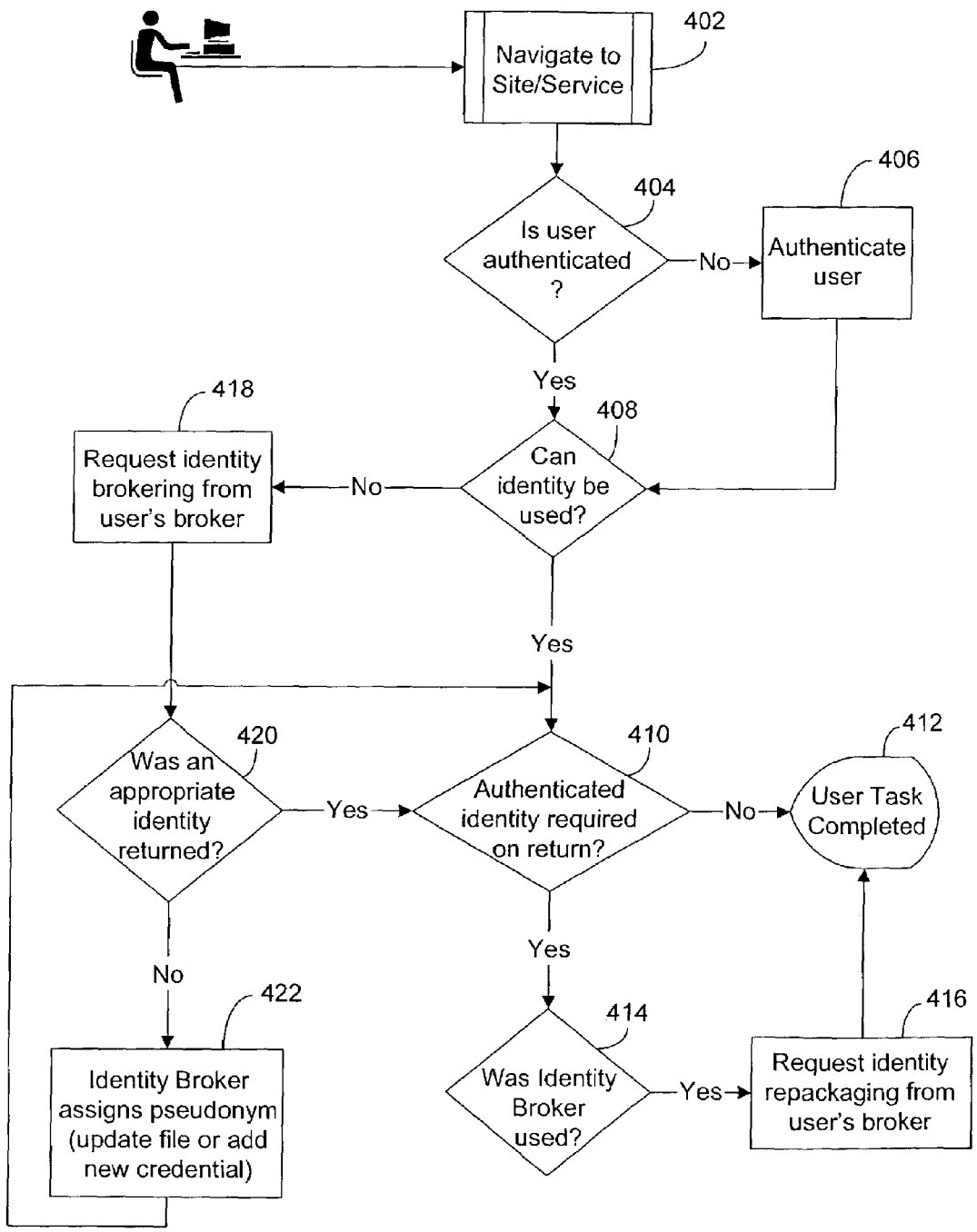
FIG. 4 is an exemplary flow chart illustrating user interaction with the target service and the identity broker.

Referring next to FIG. 4, an exemplary flow chart illustrates identity brokering after the user has registered at least two identities with the identity broker 206. The user navigates to the target service 204 from a previous site at 402 and is authenticated at 404, 406 if necessary. In a simple case, if the user identity presented to the target service 204 is recognized by the target service 204 at 408 and an authenticated identity is not required when returning to the previous site at 410, the identity broker 206 is not invoked and the user task is completed at 412. However, if an authenticated identity is required when returning to the previous site and the identity broker 206 was used at 414, the identity broker 206 repackages the user identity to include credential information at 416 and the user task is completed at 412. If the user identity presented to the target service 204 is not recognized by the target service 204, the identity broker 206 operates to deliver an appropriate identity to the target service 204 at 420 in response to a request from the target service 204 at 418. If no appropriate identity exists in the user identity database 216, the identity broker 206 interacts with the target service 204 to register a new user identity for the user at 422. Registering a new user identity may include adding a new credential. After registering new user identity information, operation continues by determining if an authenticated identity is required when returning to the previous site at 410.

Figure 5:
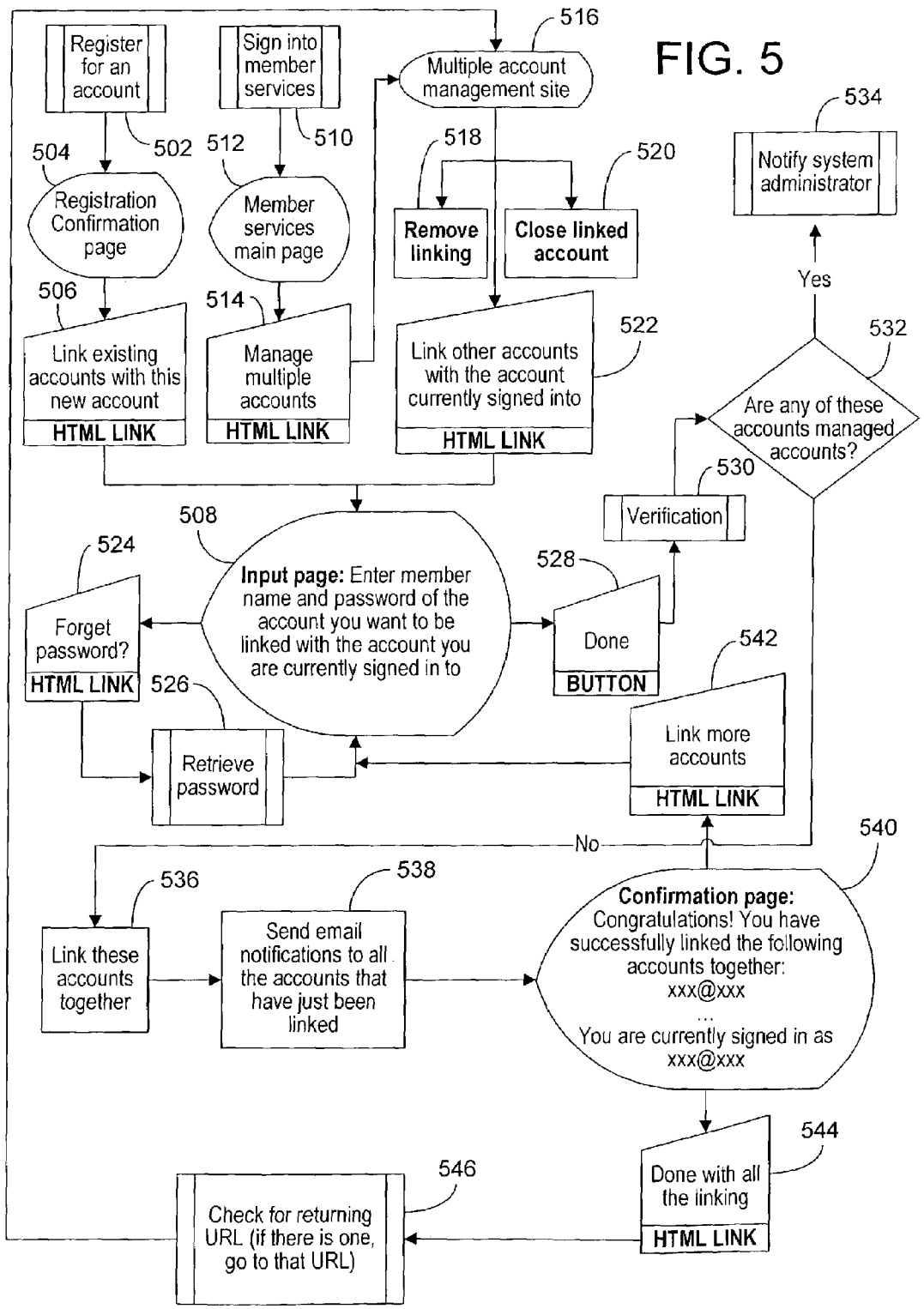
FIG. 5 is an exemplary flow chart illustrating linking multiple identities.

Referring next to FIG. 5, an exemplary flow chart illustrates linking multiple identities. The functionality illustrated in FIG. 5 may be embodied in a computer system having a graphical user interface associated with the identity broker 206 including a display and a user interface selection device. The identity broker 206 displays the registration user interface defining a user identity information field to the user on the display. For example, to register for an account at 502, the user may navigate to a registration confirmation page at 504 and choose to link existing accounts with the new account at 506. Alternatively or in addition, after signing in to member services at 510, the user views a member services main page at 512 and chooses to manage multiple accounts at 514. The identity broker 206 directs the user to the multiple accounts management site at 516 where the user may select to remove an account link at 518, close a linked account at 520, or link other accounts with a current account at 522. The identity broker 206 receives from the user via the user interface selection device user identity information associated with the user identity information field at 508. The identity broker 206 receives an execution signal from the user via the user interface selection device. For example, the user may type in a username and password then click a "Done" button or press a specific key on the keyboard. The identity broker 206 may provide assistance retrieving the password at 526 if the user has forgotten the password at 524. After receiving the execution signal at 528 and providing verification to the user at 530, the identity broker 206 determines if any of the newly linked accounts are managed accounts at 532. The identity broker 206 notifies a system administrator for the managed accounts at 534 of the newly linked accounts as determined at 532.

The identity broker 206 registers, in response to the received execution signal, the received user identity information for management of the user identities at 536. The identity broker 206 sends notification (e.g., electronic mail) to all the accounts that were linked during this operation at 538. The identity broker 206 also displays a confirmation page to the user listing the newly linked accounts at 540. When done with all linking at 544, the identity broker 206 directs to the user to a return URL at 546 if specified or to the multiple accounts management site at 516.

The user interface of the invention also includes functionality to receive from the user via the user interface selection device a request with instructions to modify (e.g., add or delete) registered user identity information. The identity broker 206 modifies the registered user identity information in accordance with the received instructions.

Figure 6:
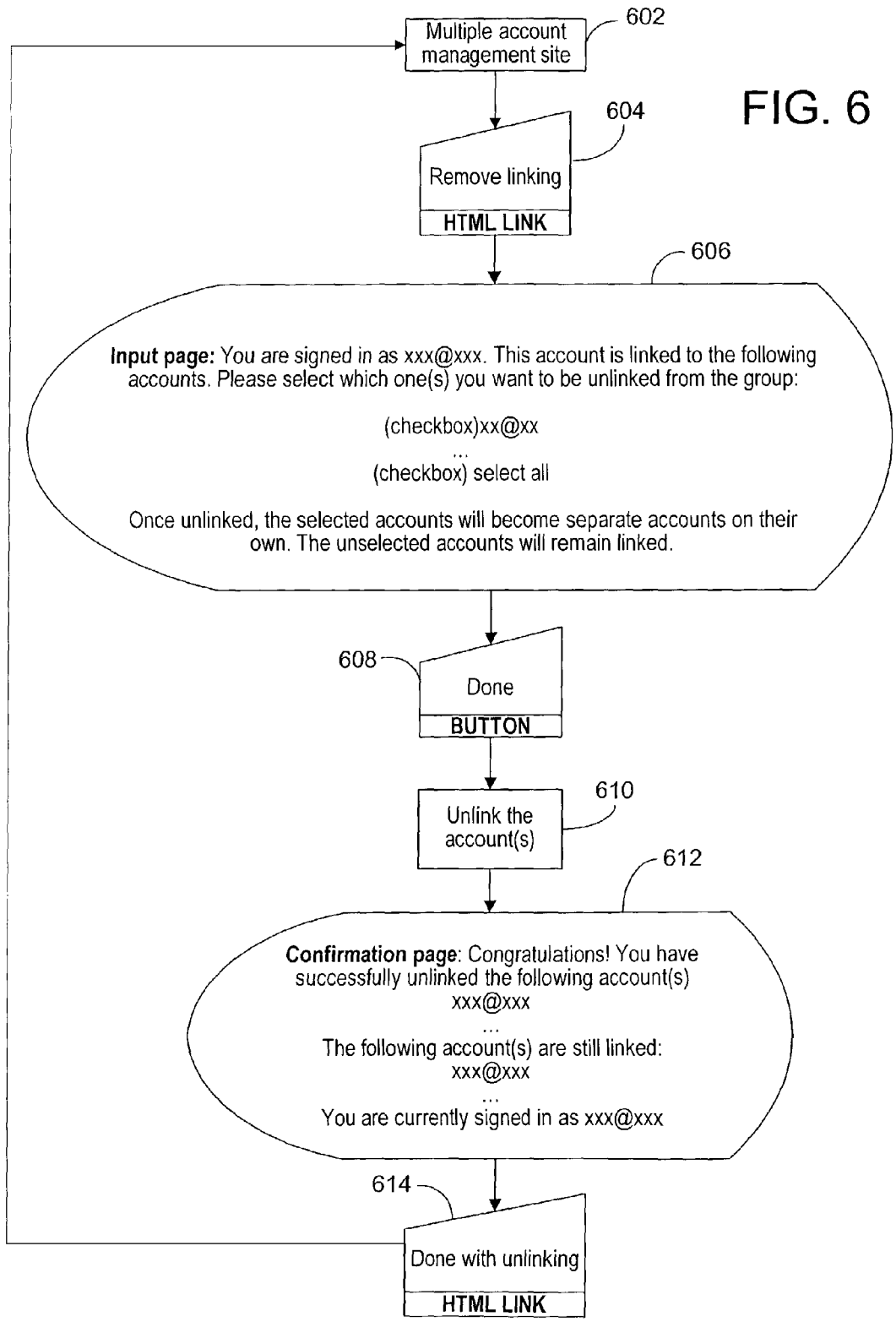
FIG. 6 is an exemplary flow chart illustrating unlinking multiple identities.

Referring next to FIG. 6, an exemplary flow chart illustrates unlinking multiple identities. The user interface of the identity broker 206 (e.g., the multiple account management site at 602) includes an option to remove a link between one or more accounts at 604. The user interface includes functionality to receive instructions from the user via the user interface selection device at 606 to unlink a selected identity from the other linked identities. When complete at 608, the identity broker 206 unlinks the specified accounts at 610, displays on the display a confirmation to the user of the unlinking operation at 612, and directs the user back to the multiple account management site at 602 when the user has finished unlinking accounts at 614.

Exemplary User Interface

An exemplary user interface embodying various aspects and features of the invention is next described. According to one embodiment of the invention, a multiple account management web site may include, but is not limited to, one or more of the following displayed resources: the name of the current account to which the user is currently signed in to, the names of the accounts that are linked to the current account, an option to link other accounts to the current account, an option to remove the links between accounts, an option to close a linked account, an option to set a password for all linked accounts, and an option to select a set of images for spoof protection for all linked accounts. If there are no linked accounts, the user interface displays a text message to inform the user that the current account is not linked to any other accounts.

According to one embodiment of the invention, the user interface for linking multiple account pages may include, but is not limited to, an input page for the user to enter the username and password of the account to be linked to another account. The input page includes a "forgot your password?" link in case the user cannot remember the password of an account. The user interface may also include a confirmation page that informs the user that accounts have been linked, and reminds the user which account the user is currently signed in to. The user interface includes links to "link more accounts" or to take the user back to a referring site. The linking relationship is symmetric. If account 1 is linked to account 2, then account 2 is also linked to account 1. Similarly, the linking relationship is commutative. After a first account is linked to a second account, then the first account is also linked to the other accounts that the second account is linked to. For example, if account 1 and account 2 are linked and account 3 and 4 are linked, then all four accounts (account 1, 2, 3 and 4) are linked together after linking account 1 with account 3. Before accounts are linked, user names and passwords are verified.

An example scenario using the option to link other accounts to the current account follows. The user has two email accounts: user@pageA.net for official communication purposes and blackknight@pageB.net for close friends and identity shielding purposes. The user has discovered an interesting online community at pageB.net and wants to create a brand new persona to use in this community. So the user navigates to authenticationsystem.net and creates a new account everest@authenticationsystem.net. After this account has been successfully created, he sees a link on the registration confirmation page, providing the option to link the new authentication system account with existing accounts. The user follows the link and is directed to a Link Accounts page on the multiple account management site, which may be part of the authentication system's member services. The user enters two other email addresses and the corresponding passwords to link the three authentication system accounts together. As the user is signed in using the newly created account, the user only needs to enter information about the other two accounts. The user views a confirmation page saying that the three accounts have been linked together successfully. When the user later checks the email accounts (either user@pageA.net or blackknight@pageB.net), the user sees an email notification from the authentication system reminding the user of the newly-linked accounts and other functions available at the multiple account management site. Exemplary email notification text contains the following: a list of the accounts that have been linked to this email account along with a list of all the accounts that are linked to this email account, a link to the multiple account management site, an option to unlink the accounts, and an option to close one or more of the linked accounts.

Similarly, the multiple account management site provides a user interface for unlinking any or all of the previously linked accounts. According to one embodiment of the invention, the user interface for removing links may include, but is not limited to, an input page listing all the accounts linked to the account that the user is signed in to and a confirmation page that informs the user which account(s) have been removed from the linked group and reminds the user which accounts are still linked (if any) and which account is currently signed in to. The user can choose to remove any or all of the listed accounts. The account that the user is currently signed in to is not listed. The user interface includes a link to take the user back to the site that referred the user to the multiple account management site.

For example, removing links between linked accounts may operate as follows supposing accounts 1, 2, 3 and 4 are linked. If the user chooses to unlink account 1 from the group, then account 1 will not be linked to accounts 2, 3 and 4 any more, but accounts 2, 3 and 4 are still linked. If the user chooses to unlink accounts 1 and 2 from the group, then accounts 1 and 2 will not be linked to accounts 3 and 4 and will not be linked to each other either. Accounts 3 and 4 remain linked. If the user chooses to unlink accounts 1, 2 and 3 from the group, it is equivalent to unlinking all four accounts. All four accounts will become solo accounts.

In another example, after using the linked multiple accounts for some time, the user may want to separate everest@authenticationsystem.net from the other two accounts because the user prefers to keep this account a secret. So the user navigates to the multiple account management site at member services and chooses to "Remove link(s)." The user selects everest@authenticationsystem.net from the list of accounts. After the user clicks "Done," the user views a page confirming that everest@authenticationsystem.net has been unlinked from the other accounts successfully. From now on, this account acts as a separate account from user@pageA.net and blackknight@pageB.net which are linked together. The linking and unlinking may be rolled back by deleting data stored in the user identity database 216 and in the user interface and disabling any optimizations by other features.

The multiple account management site also provides a link, for example, via a hypertext markup language (HTML) hyperlink to close any of the user's existing linked accounts. Closing such an account automatically unlinks it from other linked accounts. The link "Close one or more of my linked accounts" on the multiple account management site takes the user to the entry page of the closing account user interface.

In another example, the user has two authentication system accounts: user@pageA.net and user2002@authenticationsystem.net. The two accounts are linked together. The user rarely uses user2002@authenticationsystem.net and does not want to keep this account any more. So the user navigates to the multiple account management site at member services using user@pageA.net and chooses "Close one or more of my linked accounts." The user selects user202@authenticationsystem.net. The user clicks "Done," and views a page confirming that the account has been successfully closed.

Users may also set default accounts for target applications. For example, after the user has linked accounts together, the user sees a link on the confirmation page providing the option to set default authentication system accounts for participating sites and services. The user is informed that: 1) these default accounts are used during silent sign-in; 2) setting default accounts are not mandatory but will provide convenience. The user chooses to set user@pageA.net as the default authentication system account at the pageA.net mail service, blackknight@pageB.net at the pageB.net chat service, and everest@authenticationsystem.net at the pageB.net communities service.

After the above steps are finished, the user signs into pageA.net mail service using user@pageA.net to check if there is any new email. Then, the user navigates to the pageB.net communities service in the same browser window to peruse an online community and is automatically signed in as everest@authenticationsystem.net. The user also opens up a new browser window and types in the URL for the pageB.net chat service to enter a chat room. The user is signed in as blackknight@pageB.net without having to enter a member-name and password.

The invention software also provides easy switching between linked accounts. Continuing the previous example, the user signs in to the pageA.net mail service using blackknight@pageB.net and sees the inbox of 'blackknight.' After scanning through some emails, the user wants to check email at user@pageA.net. The user clicks the "Switch Account" button, which may be part of the authentication system user interface on an inbox page. The user is taken to a page owned by the authentication system listing the authentication system accounts linked to blackknight@pageB.net. The user chooses user@pageA.net and clicks "Done." The user is then taken back to the pageA.net mail service and this time sees the inbox of user@pageA.net.

The authentication system also provides an interface for the user to choose which of the linked authentication system accounts to use at a particular site if there is no default account for the site. The choice may be one-time or "always." Choosing the "always" option is equivalent to setting the selected account as the default. For example, after checking email, the user goes to an online store for the first time. When the user clicks the "Sign In" button on the store's web page, the user is taken to a page owned by the authentication system to select an authentication system account to use at this site. The user chooses user@pageA.net and is taken back to the online store's homepage signed in as user@pageA.net.

Further, the user may sign-out of any or all of the linked accounts. In one example, the user's three accounts are linked. The user is signed in to the pageA.net mail service using user@pageA.net in browser window 1, to an online auction site using user@pageA.net in browser window 2, and to a pageB.net chat service using blackknight@pageB.net in browser window 3. After the user clicks the "Sign Out" button in browser window 1, the user is signed out of the pageA.net mail service. The user is still signed in at the online auction site and the pageB.net chat service (in browser windows 2 and 3 respectively) continuing to watch bids and continuing an online conversation. In browser window 1, the user has to sign in again to visit any sites participating with the authentication system.

The authentication system provides a per-site consent process that can deal with multiple accounts. That is, the invention software includes granting consent to sites to know that multiple accounts belong to one physical person. In one example, the user has two pageA.net accounts: user@pageA.net and userfamily@pageA.net. The user does not want to receive emails from the pageA.net member services via both accounts. So the user grants consent to the pageA.net mail service to know that the two email accounts belong to the same person and one of them (user@pageA.net) is chosen as the default. From now on, the pageA.net mail service remembers which email account is the user's default one and only sends one copy of member service emails to this default account.

The pageA.net mail service may use this piece of information to allow more personalization. For example, the user runs a small business called 'Sailing Adventures Travel' and has the following two accounts (home/work): user@pageA.net and user@sailingadventurestravel.net. The user likes the pageA.net mail service and forwards all mail there. However, the user wants to send email from both of these accounts via the pageA.net mail service. That is, the user wants mail sent from the pageA.net mail service to have a "from" address of either pageA.net or sailingadventurestravel.net as directed. The invention software provides a SendAs feature allowing the user to send from any other email account that is associated and authenticated with the current account.

The multiple account management site also provides a user interface for setting one password for all the linked accounts or resetting separate passwords for linked accounts.

Exemplary Operating Environment

Figure 7:
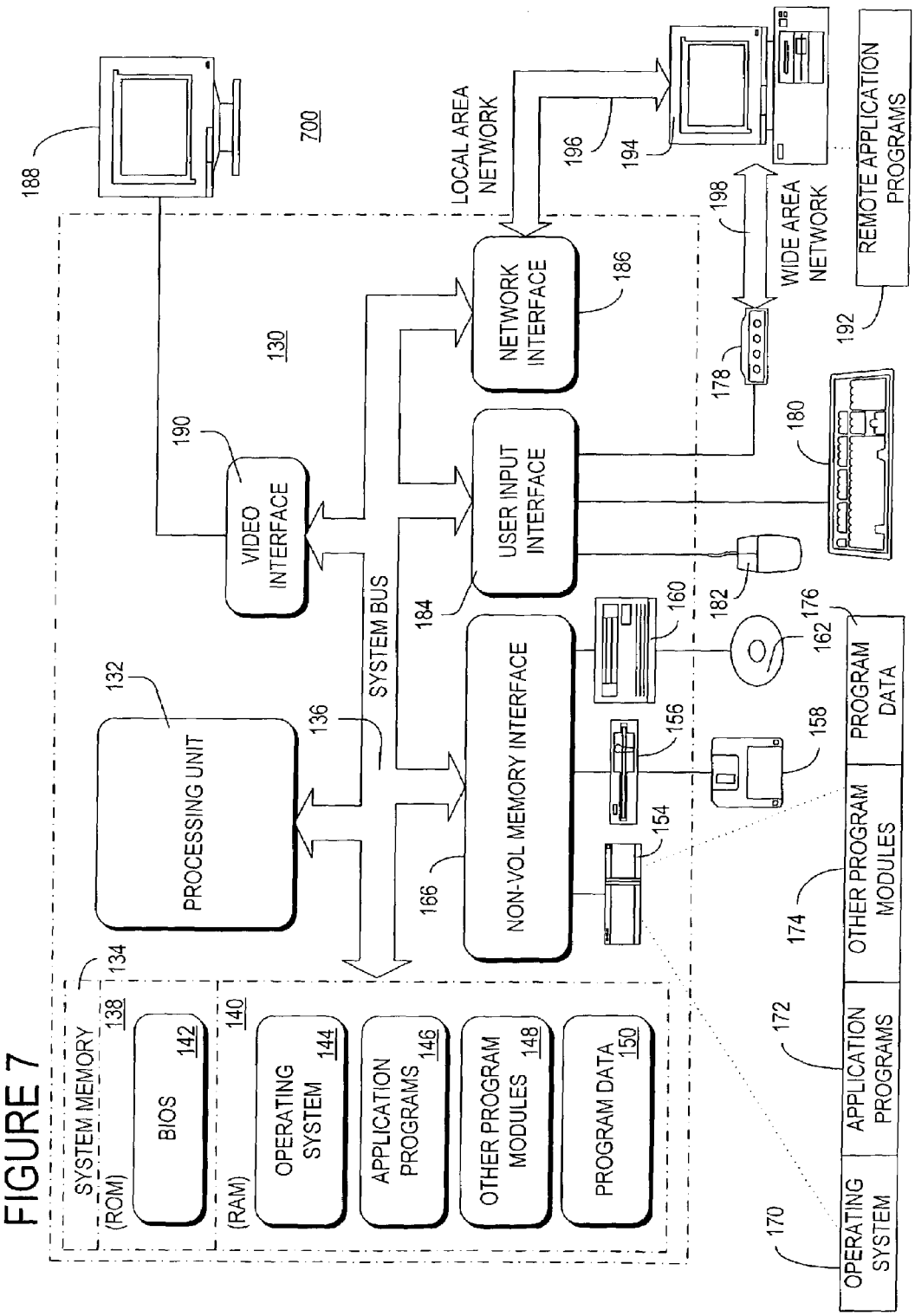
FIG. 7 is a block diagram illustrating one example of a suitable computing system environment in which the invention may be implemented.

FIG. 7 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 144, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer readable instructions, data structures, program modules and other data for the computer 130. In FIG. 7, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 194, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 3 to manage a plurality of identities associated with the user.

The following examples illustrate operation of the identity broker software of the invention. In a scenario where a single authentication system (e.g., a non-federated environment) manages multiple identities for a user, an exemplary User A has two identities in the authentication system: userA@pageA.net and userA@pageB.net. The pageA.net address is primarily associated with User A's inbox while the pageB.net address is associated with User A's personalized experience including financial portfolios. In this example, User A first signs in with the pageA.net address to review an inbox and then checks stock prices without explicitly signing in with the pageB.net address. This flow is described below.

1. User A signs in to the email service using userA@pageA.net.

2. User A does not have an authentication ticket.

3. The authentication system authenticates the identity and sends the authentication ticket to the email service.

4. The email service retrieves the inbox and User A reviews the retrieved inbox.

5. User A navigates to a financial web site (i.e., another target service) and forwards the authentication ticket to the financial web site.

6. The financial web site receives the authentication ticket, but cannot find any matches to known identities so the financial web site sends the authentication ticket to the identity broker 206.

7. The identity broker 206 finds that userA@pageB.net is linked to userA@pageA.net and is associated with the financial web site.

8. The identity broker 206 sends a request to the authentication system to validate userA@pageB.net and receives an authentication ticket from the authentication system.

9. The identity broker 206 sends the new authentication ticket to the financial web site.

10. The financial web site finds User A's portfolio and completes the desired user activity.

In a federated scenario example, User A has a pageA.net account and a pageB.net account. The pageA.net account is authenticated by User A's employer and provides User A with access to materials both within User A's company and with companies within a trust cartel of User A's company. User A uses the pageB.net account to access content on the Internet (e.g., read Internet mail). User A often uses free time to check his Internet mail while authenticated with the pageA.net account. An exemplary flow describing such a scenario follows.

1. User A registers his pageA.net and pageB.net identities with the identity broker 206.

2. User A signs in to the pageB.net mail server using the pageA.net authentication ticket.

3. The pageB.net mail server sends a request to an authentication system to confirm the pageA.net identity.

4. The pageB.net mail server finds that it cannot use the pageA.net authentication ticket.

5. The pageB.net mail server sends the pageA.net authentication ticket to the identity broker 206 specified in the authentication ticket.

6. The identity broker 206 reviews the registered identities associated with the pageA.net identity and finds that the pageB.net identity may be used for mail.

7. The identity broker 206 requests the authentication system to authenticate the pageB.net identity.

8. The identity broker 206 returns the pageB.net identity to the pageB.net mail server in an authenticated manner.

9. The pageB.net mail server packages User A's mail messages for delivery to User A.

10. The pageB.net mail server requests the identity broker 206 to reset the authentication ticket for the pageA.net service.

11. The identity broker 206 fetches the appropriate authentication ticket for use in returning the packaged mail messages through the pageA.net firewall.

12. User A's pageA.net server accepts the inbound message because it contains an authenticated pageA.net identity.

13. User A reviews the requested email from the pageB.net mail server in the accepted inbound message.

Web Addresses

Information in this document, including network addresses such as uniform resource locators and Internet web site references, is subject to change without notice. Unless otherwise noted, the example companies, organizations, products, domain names, e-mail addresses, logos, people, places and events depicted herein are fictitious, and no association with any real company, organization, product, domain name, e-mail address, logo, person, place or event is intended or should be inferred.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of managing a plurality of identities associated with a single user comprising:

assigning an identity broker at a server and at a client to act on behalf of the single user;

receiving, at the server, user identity information from the single user from the client, the user identity information representing a plurality of user identities for authenticating the single user with one or more target services, said user identity information being different from the plurality of user identities, each of the user identities being different and being associated with the one or more target services;

sending, from the server, one or more requests to the target services to obtain additional user identity information, the additional user identity information comprising credential information for each of the user identities, each of the requests comprising a portion of the received user identity information;

receiving the additional user identity information from the target services in response to authentication of the single user by the target services via the sent requests;

synchronizing the received identity information and the received additional user identity information between the server and the client;

registering the received user identity information and the received additional user identity information for management of the plurality of user identities such that the single user is authenticated with the one or more target services based on the user identity information;

providing a linking relationship among the user identity information and the additional user identity information of the plurality of user identities at the server such that each user identity information of the single user corresponds to the additional user identity information of the single user, wherein the linking relationship enables the server to manage the plurality of user identities in groups; and wherein the assigned identity brokers on the server and the client manage the identity of the single user as a function of the received identity information and the received additional user identity information without a party other than the single user to know about the received additional user identity information.

2. The method of claim 1, wherein sending one or more requests to the target services comprises sending one or more requests to the target services to authenticate the received user identity information.

3. The method of claim 1, wherein registering comprises storing the user identity information in a database for management of the user identities when the user subsequently seeks access to one or more of the target services.

4. The method of claim 1, wherein the user identity information comprises one or more of the following: credential information, a login identifier and a password.

5. The method of claim 4, wherein the credential information comprises one or more of the following: a certificate, an authentication token, and an authentication ticket.

6. The method of claim 1, wherein the target services comprise one or more of the following: a server, a web site, and an application program.

7. The method of claim 1, wherein sending one or more requests to the target services comprises sending the user identity information associated therewith to the target services for authentication, wherein the target services interact with an authentication system to authenticate the user via the user identity information.

8. The method of claim 1, further comprising interacting with one of the target services to provide registered user identity information to said one of the target services in response to a request from said one of the target services for one or more of the user identities associated therewith.

9. The method of claim 8, wherein the registered user identity information are stored in a database, and wherein interacting comprises:
   receiving, from said one of the target services, a request for one or more of the user identities associated therewith, the request comprising a list of requested identity types;
   retrieving the registered user identity information from the database corresponding to the list of requested identity types; and
   providing the retrieved user identity information to said one of the target services in response to the received request.

10. The method of claim 9, further comprising validating the retrieved user identity information prior to providing the retrieved user identity information to said one of the target services.

11. The method of claim 10, wherein validating comprises sending the retrieved user identity information to an authentication system to authenticate the user.

12. The method of claim 9, further comprising:
   requesting, from said one of the target services, new user identity information associated with the user if no user identity information in the database corresponds to the list of requested identity types;
   receiving the requested, new user identity information from said one of the target services; and
   registering the received, requested, new user identity information.

13. The method of claim 12, wherein the new user identity information comprises credential information.

14. The method of claim 1, further comprising:
   receiving, from the user, a request with instructions to modify the registered user identity information; and
   modifying the registered user identity information in accordance with the received instructions.

15. The method of claim 14, wherein modifying the registered user identity information comprises unlinking one of the user identities from the other user identities.

16. The method of claim 1, wherein the credential information corresponds to one of a plurality of federated authentication systems.

17. The method of claim 1, wherein one or more computer storage media have computer-executable instructions for performing the method recited in claim 1.

18. A method of managing user identity information corresponding to a plurality of identities associated with a user at a client, each of the user identities being associated with one or more target services, the identities being stored in a database, the method comprising:
   interacting between an identity broker at a server and an identity broker at the client on behalf of the user in response to a request from the user;
   interacting between the server and one of the target services to provide the user identity information to said one of the target services in response to a request from said one of the target services for one or more of the identities associated therewith, said user identity information representing a plurality of user identities for authenticating the user with the one or more target services, said user identity information being different from the plurality of user identities, wherein the identity information is synchronized between the client and the server; wherein interacting comprises:
   receiving, from said one of the target services, a request for one or more of the user identities associated therewith, the request comprising a list of requested identity types;
   retrieving the user identity information from the database accessible by the server corresponding to the list of requested identity types;
   providing the retrieved user identity information to said one of the target services in response to the received request, wherein the retrieved user identity information authenticates the user with the one or more target services,
   wherein the database provides a linking relationship among the user identity information of the one or more of the identities of the user, wherein the linking relationship enables the server to manage the plurality of user identities in groups; and
   wherein the identity brokers on the server and the client manage the user identity information as a function of the user identity information and the user identities without a party other than the user to know about the user identities.

19. The method of claim 18, further comprising validating the retrieved user identity information prior to providing the retrieved user identity information to said one of the target services.

20. The method of claim 19, wherein validating comprises:
   sending the retrieved user identity information to an authentication system for authentication; and
   receiving, from the authentication system, authenticated user identity information.

21. The method of claim 19, wherein providing the retrieved user identity information to said one of the target services comprises providing the validated user identity information to said one of the target services.

22. The method of claim 18, further comprising:
   requesting, from said one of the target services, new user identity information associated with the user if no user identity information in the database corresponds to the list of requested identity types;
   receiving the requested, new user identity information from said one of the target services; and
   storing the received, requested, new user identity information in the database.

23. The method of claim 22, wherein the new user identity information comprises credential information.

24. The method of claim 18, wherein the user identity information comprises credential information.

25. In a computer system having a graphical user interface including a display and a user interface selection device, a method of managing a plurality of identities associated with a user comprising:
   assigning an identity broker at a server and at a client to act on behalf of the single user;
   displaying a registration user interface from the server to the user on the display, the registration user interface defining a user identity information field;
   receiving from the user at the client via the user interface selection device user identity information associated with the user identity information field, the user identity information representing a plurality of user identities for authenticating the user with one or more target services, said user identity information being different from the plurality of user identities, each of the user identities being different and being associated with the one or more target services; receiving an execution signal from the user via the user interface selection device;

synchronizing the received user identity information between the server and the client;

registering, in response to the received execution signal, the received user identity information for management of the user identities such that the user is authenticated with the one or more target services based on the user identity information; and providing a linking relationship among the user identity information of the plurality of user identities at the server such that each user identity information of the user corresponds to the additional user identity information of the single user, wherein the linking relationship enables the identity broker at the server and the identity broker at the client to manage the plurality of user identities in groups without a party other than the user to know about the additional user identity information.

26. The method of claim 25, wherein registering the received user identity information comprises storing the received user identity information in a database for management of the user identities when the user subsequently seeks access to one or more of the target services.

27. The method of claim 25, wherein registering the user identity information comprises linking the user identities or unlinking the user identities or both.

28. The method of claim 25, further comprising:
receiving, from the user via the user interface selection device, a request with instructions to modify the registered user identity information; and
modifying the registered user identity information in accordance with the received instructions.

29. The method of claim 25, wherein the user identity information comprises one or more of the following: credential information, a user identifier, and a password.

30. The method of claim 29, wherein the credential information comprises one or more of the following: an authentication ticket, a password, an authentication certificate, and a token.

31. A computer storage medium having stored thereon a data structure representing a plurality of identities associated with a user associated with a client, each of the user identities being associated with one or more target services, the data structure comprising:
a first field representing user identity information corresponding to the user identities, said user identity information representing a plurality of user identities for authenticating the single user with one or more target services, said user identity information being different from the plurality of user identities;
a second field representing additional user identity information to provide authentication for each of the user identities stored in the first field, wherein the first field and the second field enable authentication of the user based on the user identity information and the additional user identity information for authenticating with the one or more target services;
wherein the first field and the second field are executed on a client a server and the one or more target services said the first field and the second field are synchronized; and
a table, maintained by an identity broker at the server or at the client, providing a linking relationship among the user identity information and the additional user identity information of the plurality of user identities at the server such that each user identity information of the single user corresponds to the additional user identity information of the single user, wherein the linking relationship enables the identity broker at the server and the identity broker at the client to manage the plurality of user identities in groups without a party other than the user to know about the additional user identity information and wherein the table stores an additional flag to indicate whether or not one of the plurality of user identities is linked to some other identity.

32. The computer storage medium of claim 31, wherein the user identity information comprises a user identifier or a password or both.

33. The computer storage medium of claim 31, wherein the additional user identity information comprises one or more of the following: a certificate, an authentication token, and an authentication ticket.

34. One or more computer storage media having computer-executable components executable at a server for managing a plurality of identities associated with a user, the components comprising:
an interface module for receiving user identity information from the user from a client, the user identity information representing a plurality of user identities for authenticating the single user with one or more target services, said user identity information being different from the plurality of user identities, each of the user identities being different and being associated with the one or more target services;
a synchronization component for synchronizing the identity information between the client and the server;
a validation module for sending one or more requests to the target services to obtain additional user identity information, the additional user identity information comprising credential information for each of the user identities, each of the requests comprising a portion of the received user identity information, the validation module receiving the additional user identity information from the target services in response to authentication of the user by the target services via the sent requests;
a database module for registering the received user identity information and received additional user identity information for management of the user identities, said database module providing a linking relationship among the user identity information and the additional user identity information of the plurality of user identities at the server such that each user identity information of the single user corresponds to the additional user identity information of the single user, wherein the linking relationship enables the server to manage the plurality of user identities in groups; and
a broker module for interacting with one of the target services to provide registered user identity information to said one of the target services in response to a request from said one of the target services for one or more of the user identities associated therewith, wherein the broker module enable authentication of the user with the one or more target services based on the user identity information without a party other than the single user to know about the received additional user identity information.

35. The computer storage media of claim 34, wherein the interface module comprises a graphical user interface or a textual user interface or both.

36. The computer storage media of claim 34, wherein the registered user identity information is stored in a database, and wherein said interacting performed by the broker module comprises:
- receiving, from said one of the target services, a request for one or more of the user identities associated therewith, the request comprising a list of requested identity types;
- retrieving the registered user identity information from the database corresponding to the list of requested identity types; and
- providing the retrieved user identity information to said one of the target services in response to the received request.

37. The computer storage media of claim 36, wherein the broker module validates the retrieved user identity information prior to providing the retrieved user identity information to said one of the target services.

38. The computer storage media of claim 34, wherein the interface module receives, from the user, a request with instructions to modify the registered user identity information, the interface module modifying the registered user identity information in accordance with the received instructions.

39. The computer storage media of claim 34, wherein the database module performs:
- requesting, from said one of the target services, new user identity information associated with the user if no user identity information in the database corresponds to the list of requested identity types;
- receiving the requested, new user identity information from said one of the target services; and
- registering the received, requested, new user identity information.

40. The computer storage media of claim 34, wherein the interface module, the validation module, and the database module operate in a client computer or a server computer or both.

41. An account management system at a server for managing a plurality of identities associated with a user, the account management system comprising:
- an identity broker at the server to act on behalf of the user;
- an identity broker at a client to act on behalf of the user;
- a user interface for receiving user identity information from the user from the client, the user identity information representing a plurality of user identities for authenticating the single user with one or more target services, said user identity information being different from the plurality of user identities, each of the user identities being associated with one or more target services;
- a validation component for sending one or more requests to the target services to obtain additional user identity information, the additional user identity information comprising credential information for each of the user identities, each of the requests comprising a portion of the received user identity information, the validation component receiving the additional user identity information from the target services in response to authentication of the user by the target services;
- a synchronization component for synchronizing the received identity information and the received additional user identity information between the server and the client;
- a database storing the user identity information received by the user interface and the additional user identity information received by the validation component, said database providing a linking relationship among the user identity information and the additional user identity information of the plurality of user identities at the server such that each user identity information of the single user corresponds to the additional user identity information of the single user, wherein the linking relationship enables the identity broker at the server and the identity broker at the client to manage the plurality of user identities in groups without a party other than the user to know about the additional user identity information; and
- computer-executable instructions which, when executed on a data processing system having a processor and access to the database, manage the user identities by performing:
  - receiving, from said one of the target services, a request for one or more of the user identities associated therewith, the request comprising a list of requested identity types;
  - retrieving the registered user identity information from the database corresponding to the list of requested identity types; and
  - providing the retrieved user identity information to said one of the target services in response to the received request, wherein that the retrieved user identity information authenticates the user with the one or more target services.

42. The account management system of claim 41, wherein the computer-executable instructions further comprise validating the retrieved user identity information prior to providing the retrieved user identity information to said one of the target services.

* * * * *